Nov. 13, 1945.           H. J. OGORZALY           2,388,932
CONTINUOUS ISOMERIZATION PROCESS
Filed Nov. 20, 1942
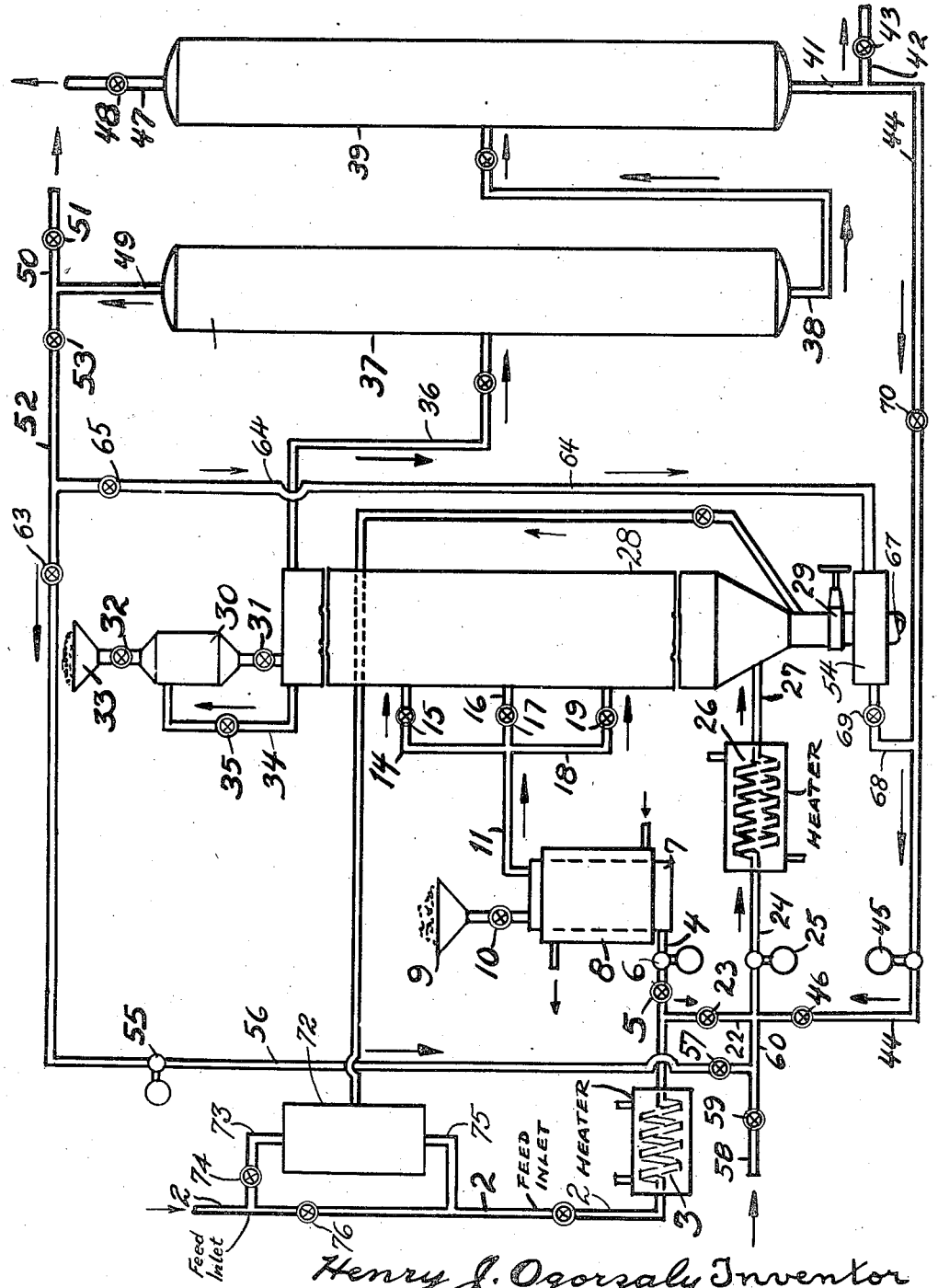
Henry J. Ogorzaly Inventor
By P. L. Young Attorney Patented Nov. 13, 1945

2,388,932

UNITED STATES PATENT OFFICE 2,388,932

CONTINUOUS ISOMERIZATION PROCESS

Henry J. Ogorzaly, Baton Rouge, La., assignor to Standard Oil Development Company, a corporation of Delaware Application November 20, 1942, Serial No. 466,244

15 Claims. (Cl. 260—683.5)

The present invention relates to the vapor phase isomerization of paraffinic hydrocarbons, in particular straight chain or normal paraffinic hydrocarbons containing at least four carbon atoms per molecule, to produce the corresponding branched chain or isoparaffins catalytically by means of Friedel-Crafts type catalysts, in particular the aluminum halides such as aluminum chloride, while carrying out the reaction under isomerization reaction conditions and in the presence of promotional amounts of at least one hydrogen halide.

Such reactions have heretofore been carried out along these lines but a number of difficulties and disadvantages have become apparent, particularly where such processes have been adapted to commercial usage. One difficulty has been in the maintenance of aluminum chloride in the isomerization reaction zone where vapor phase operations are carried out because of the fact that the aluminum chloride volatilizes and sublimes and has a tendency to be carried out of the reaction zone in the vapors of the reacted mixture. This has to some extent been remedied by the impregnation and sorption of aluminum chloride vapors in porous carriers and the use of catalyst beds made of these porous carriers containing aluminum chloride has served to minimize the release of aluminum chloride vapors if care is taken not to introduce too much aluminum chloride into the porous carrier. However, in large scale commercial units it is a problem to accurately get sufficient aluminum chloride in the porous carrier while the reaction is being carried out and to maintain this desired quantity therein since there is a tendency to incorporate too much aluminum chloride in the bed while running the reaction, thereby giving rise to the above-mentioned difficulties. On the other hand, if too little aluminum chloride is incorporated in the catalyst bed then the reaction has a tendency to be incomplete and does not approach equilibrium conditions as between the iso and normal paraffins; hence the efficiency of the unit is materially lowered thereby. Still a further objection to such a process wherein aluminum chloride vapors are continuously added to a bed of aluminum chloride sorbed in porous carrier in order to maintain catalytic activity has been in the difficulty of obtaining substantially complete utilization of the aluminum chloride prior to the clogging or plugging of the pores of the catalyst with degradation products. In other words, the catalyst loses its greatest utility at some point prior to the most efficient and complete utilization of all of the aluminum chloride contained in it, and in order to obviate this difficulty in the past it has been necessary to maintain in the catalyst bed only quite small amounts of aluminum chloride in order that they be most efficiently utilized and, as pointed out above, this leads to an incomplete reaction, one in which the isobutane production fails to reach that commercially feasible.

It is an object of the present invention to provide an improved method of carrying out vapor phase isomerization reactions to prevent the carrying over of any substantial amounts of aluminum chloride vapors in the reacted effluent while at the same time maintaining in the reaction zone sufficiently high concentrations of aluminum chloride to achieve substantial equilibrium between iso and normal paraffins within the time ordinarily employed in commercial reactions. It is a further object of the invention to achieve in so far as possible the substantially complete utilization of aluminum chloride present in the catalyst mass. It is a further object of the invention to provide a substantially improved method for the carrying out of a vapor phase reaction, particularly along commercial lines.

In order to carry out these objects as well as others which will be apparent upon a fuller understanding of the invention, it has been found that highly desirable results may be achieved if the catalyst bed which is made up of aluminum halide, particularly aluminum chloride sorbed on a porous carrier, is formed in a particular and unique way. Ordinarily a vertical column of porous carrier has impregnated therein vapors of aluminum chloride which may be carried into the mass which is heated to some 350 to 400° F. by means of inert gases or portions of the feed stock. Thus, for example, normal pentane, methane, ethane, propane, carbon dioxide, nitrogen, hydrogen and the like may be employed for the carrying of the sublimed aluminum chloride into contact with a vertical column of a suitable porous carrier maintained under conditions inducing absorption of the vapors of aluminum chloride, and during the isomerization reaction a side stream of normal butane, for example, may be passed through an aluminum chloride pickup drum to entrain aluminum chloride vapors and this mixture is then likewise passed through the isomerization catalyst bed in order to compensate for any small losses in aluminum chloride. In the present process, however, it has been discovered that if the feed stock going to a continuous isomerization unit is passed upwardly through a catalyst bed while the active catalyst is being formed at a point remote to that of the introduction of the feed stock and the bed is continuously being formed by the addition of fresh carrier to the top of the bed with the removal of a corresponding amount of spent catalyst from the bottom of the bed, many of the disadvantages of the prior process are overcome while retaining the advantages heretofore achieved. Suitable carriers may be any one of the following: activated carbon, diatomaceous earth, acid-treated clays such as Super Filtrol, the bentonitic clays, montmorillonite, bauxite either partially or substantially completely dehydrated such as Porocel, activated alumina, alumina gel, silica gel, and the like. A particularly desirable catalyst carrier is Porocel.

In making up an ordinary or conventional bed of aluminum chloride in Porocel, wherein the vapors of aluminum chloride are passed upwardly through the carrier, the aluminum chloride would be present in an amount between about 5% and about 20% of the weight of the carrier, with the highest concentration being at the bottom of the carrier and gradual diminution in the amount of aluminum chloride occurring in the bed until at the very uppermost portion of the bed only 1 or 1½ weight per cent of aluminum chloride would be present. In practicing the present invention, however, a bed is made up in such a way that the highest concentration of active aluminum chloride in the carrier is found at a point remote from either top or bottom of the carrier bed and this is accomplished by the introduction of vapors of aluminum chloride at a point somewhere between ⅓ to ⅔ of the distance from the bottom of the column to the top thereof for example, at about 40% of the height of the catalyst mass from the bottom so that a high concentration of aluminum chloride, such as 8 to 12%, is to be found at a substantial distance from both the bottom and the top extremities of the catalyst bed.

With a mixture of hydrogen chloride and normal butane passing upwardly through the bed, and with the removal of spent catalyst from the bottom thereof coupled with the addition of fresh carrier to the top thereof in like manner and with continuous addition of aluminum chloride vapors at some point approximating the ⅓ to ⅔ region a substantially constant type of bed of unique composition is maintained in which the concentration of active aluminum chloride diminishes from the highest concentration and activity at the point of introduction of the aluminum chloride vapors to the point where the spent catalyst is withdrawn from the reaction zone, while at the same time during the passage of any particular portion of the feed stock through the bed a gradual increase in aluminum chloride activity acts upon the normal butane and hydrogen chloride mixture up to the point nearest the point of introduction of the aluminum chloride vapors into the bed followed by the catalytic effect of an aluminum chloride concentration of gradually diminishing strength as the normal butane-hydrogen chloride mixture continues to pass upwardly until it reaches a point where the reacted mixture is passing through what amounts to substantially only unimpregnated carrier. In this way hardly any of the aluminum chloride vapors escape from the reaction zone and are carried into the remaining pipes and valve of the system, and at the same time the aluminum chloride is substantially completely utilized by the time that the spent catalyst is removed from the bottom of the reaction zone.

The actual point of introduction of the aluminum chloride vapors into the carrier mass depends to some extent upon the amount of aluminum chloride vapors being introduced and upon the intensity of isomerization desired. As previously known, the carrier should be subjected to at least a partial dehydration treatment in order to insure that once the dried carrier is introduced into the isomerization reaction zone no further quantities of free water are given off during the isomerization reaction as this free water has a tendency to hydrolyze aluminum chloride thus materially decreasing the catalyst life thereof. Treatment of bauxite or Porocel to calcine the same may be carried out for a period as long as 18 hours under a temperature of 900–1000° F. or from 2 to 3 hours at 1300° F. Partially dehydrated bauxites are particularly useful and seem to improve the catalyst life of the aluminum chloride. The temperature under which the aluminum chloride is introduced into the carrier may vary considerably depending upon the pressure employed and the amount of carrier gas passed through the pickup chamber, but in general this temperature will vary between about the sublimation temperature of aluminum chloride up to the temperature employed in the isomerization reaction zone; and depending upon the particular concentration of aluminum chloride to be maintained at the point of highest concentration in the catalyst bed, the amount of carrier gas passed therethrough will vary likewise.

Feed stocks employed may be any one of a number of common types available at petroleum refineries, particularly normal butane, normal pentane, normal hexane, normal heptane, and higher homologues, or mixtures of two or more of these normal paraffins, or natural mixtures such as field butanes, casinghead gasoline, and the like. Stocks predominating in normal butane and/or normal pentane are particularly desirable in the present process. Free or molecular hydrogen is sometimes employed in the present process in order to suppress undesired side reactions and this expedient is commonly employed in connection with the longer straight chain paraffins such as hexane, heptane, casinghead gasoline, straight run naphthas, and the like. This hydrogen may be introduced with the feed stock or it may be employed separately for passage through the aluminum chloride pickup drum to serve as a carrier gas for the introduction of aluminum chloride into the porous carrier.

As previously mentioned, suitable promoters are employed and usually they are the halogen-containing type such as hydrogen chloride, hydrogen bromide, chlorine, bromine, carbon tetrachloride, methyl, ethyl, isobutyl chlorides and bromides, chloroform, etc. Generally their concentrations range between 2 and about 12 weight per cent of the feed stock but they may range as high as 22 to 24% and as low as 1%.

The times of contact or throughput may vary considerably depending upon the feed stock, and the temperatures employed in the reaction, but in general they vary between about 0.5 and about 5 liquid volumes of feed per volume of catalyst mass per hour. This corresponds roughly to about 40 to 500 seconds and the temperatures maintained may vary between 150° F. and about 400° F., preferably, in the case of normal butane, between about 200° F. and about 375° F., and in the case of normal pentane isomerization between about 150° F. and about 225° F., and pressures may range between about atmospheric, in the case of normal butane, up to as high as 350 lbs./sq. in., preferably between about 50 and 300 lbs./sq. in. The adjustment of pressure is usually made so as to efficiently effect a separation of the hydrogen chloride in the stripping tower to which the reacted product is fed.

It has also been found expedient in carrying out the commercial aspects of this process, where refinery C₄ and/or C₅ feed stocks are employed, to subject these feed stocks which are known to contain impurities such as water and/or olefins, sulfur, sulfur compounds such as mercaptans, thioethers, disulfides and the like, to pretreatments in order to remove these objectionable impurities. A particularly useful and ingenious utilization of spent catalyst coming from the isomerization is here applied in that this spent catalyst may be used for pretreating the feed stock, usually in the absence of the isomerization promoter, to remove olefins and water and the like therefrom. In connection with the removal of small traces of sulfur and sulfur compounds a portion of the spent catalyst may be employed in the promoter recycle line from the top of the stripper back to the point of its admixture with the fresh feed stock going to the isomerization unit wherein the same or a lower temperature by as much as 150° F. from that of the isomerization reactor may be employed for the formation of hydrogen sulfide complexes with the traces of aluminum chloride remaining in the spent catalyst.

No particular type of apparatus or any special design or construction is necessary to carry out the process of the present invention. It is sufficient that the equipment which is customarily employed in vapor phase treatment of hydrocarbons with solid type catalysts will serve satisfactorily for the present process. It is preferred, however, to employ a reactor of the cylindrical type having a fairly small diameter but of quite a sizeable height so that the path of the feed stock vapors through the catalyst bed will be of sufficiently long duration when coupled with the desired rates of throughput to effect an approach to equilibrium conditions in the reacted mixture.

In order to more fully describe the character of the invention, reference is had to the accompanying drawing which represents a more or less diagrammatical sectional elevation of a plant designed to carry out the present invention. For purposes of illustration, although with no intention of being limited thereto, the operation of the plant as described in this drawing will be stated with reference to a typical refinery feed stock using hydrogen chloride as the promoter, aluminum chloride as the catalyst, and Porocel as the catalyst carrier. The feed stock contains about 96 grains of sulfur and sulfur compounds per thousand cubic feet of gas. The gas, exclusive of these sulfur impurities, has a composition roughly as follows:

|  | Per cent |
|---|---|
| N-butane | 92 |
| Propane | 0.5 |
| Pentane | 0.5 |
| Water | 0.01 |
| C₄ olefins | 0.1 |

The remainder being isobutane.

Such a feed stock is introduced into the system through line 2 and, depending upon the specific amounts of impurities, may follow either of two courses. Olefins and water may be removed therefrom, if desired, by closing valve 76 and opening valve 74, permitting the feed stock to pass through line 73, treating chamber 72, through line 75, back to feed line 2, thence through heater 3 and into the reaction zone as hereinafter described. Or, if the impurities are negligible, valve 74 may be closed, valve 76 opened, and treating chamber 72 by-passed. As before stated, treating chamber 72 contains spent or partially spent aluminum chloride catalyst removed from the bottom of reactor 28 as hereinafter described. Usually heater 3 is maintained at between about 200° F. and about 250° F. or it corresponds with the temperature under which the aluminum chloride pickup drum is maintained. The heated mixture is passed from heater 3 into lines 4 and 22 by means of partially opened valves 5 and 23. That portion of the feed stock passing into line 4 by means of compressor 6 is passed through an aluminum chloride pickup chamber 7 provided with a temperature regulating jacket 8 through which steam or other suitable heating medium is passed and this chamber contains aluminum chloride in suitable form such as granules, lumps, pellets or the like, maintained under sufficiently high temperature to insure sublimation thereof. Fresh quantities of aluminum chloride may be introduced into the aluminum chloride pickup chamber 7 by means of hopper 9 and valved conduit 10. The normal butane may be passed through the aluminum chloride pickup chamber 7 at such a rate and under such a temperature that varying amounts of aluminum chloride will be entrained therein. These amounts may vary considerably and usually range between about 0.1 weight per cent and about 4 or 5 per cent. The actual upper limit is usually fixed by the capacity of the sorbent carrier to take up the aluminum chloride vapors and by the speed with which the high concentration needs to be attained in the isomerization catalyst mass. Generally, however, the normal butane contains about 0.1 to about 0.5 weight per cent of aluminum chloride, but occasions do arise where this carrier gas of normal butane may be satisfactorily operated for the maintenance of catalyst activity with an aluminum chloride content of between about 0.01 and about 0.05% by weight. The entrained vapors pass through line 11 and depending upon the particular speed of reaction, sorptiveness of the particular carrier, amount of aluminum chloride introduced, and various other factors, these vapors are introduced into one or more of a number of spaced points in the isomerization reaction zone 28 by means of lines 14, 16 and 18, controlled by valves 15, 17 and 19.

The porous carrier, for example Porocel, is introduced into and substantially fills isomerization reactor 28, being retained in the reactor by means of outlet 29, which may be a rotating valve, slide valve or star feeder, and it is introduced into this chamber from hopper 33 by means of valved conduit 32 into an intermediate chamber 30 for pressure equalization by means of line 34 containing valve 35. Before the pressure has been equalized, valve 32 is closed, valve 31 is opened, and the carrier is introduced into the system. Of course, in preparing a whole new catalyst mass where no pressure is on the reactor, both valves 31 and 32 may remain open and the desired amount of carrier introduced from hopper 33 directly. Once the carrier has been placed in the reactor 28, valves 31 and 35 are closed, a pressure of around 200 lbs./sq. in. is placed on reactor 28 and the aluminum chloride enters line 18, for example, through open valve 19. The vapors pass upwardly through the Porocel in reactor 28 and after a sufficient quantity of vapors have been introduced to give a concentration of between 5% and 20% by weight of aluminum chloride in the reactor at the inlet of line 18, the valve 23 in line 22 is opened and normal butane feed stock is pumped by means of compressor 25 through line 24 into heater 26 where it is brought up to the reaction temperature of, for example, 200–375° F. Hydrogen chloride is introduced into the system through line 58, controlled by valve 59, and is present in an amount between about 2% and about 12% by weight of the normal butane feed stock. It is passed through line 27 into the bottom of reactor 28 and flows upwardly therethrough under isomerization reaction conditions.

The reacted mixture leaving isomerization reactor 28 passes by means of line 36 into the stripping tower 37 which is under a somewhat lower pressure than that maintained in reactor 28. Conditions of operation of stripper 37 are so adjusted as to give an overhead product of propane and lighter products, such as hydrogen chloride, hydrogen sulfide, and if elemental hydrogen is used in the system this comes overhead as well while the bottoms from this operation containing normal butane and isobutane are passed by means of line 38 into fractionating tower 39 which is operated so as to give isobutane overhead through line 47, controlled by valve 48, and normal butane as a bottoms which is withdrawn from the tower through line 41 and may either be returned to the isomerization unit 28 by means of line 44 and pump 45 through valves 46 and 70 and compressor 25 or it may be withdrawn from the system through line 42, controlled by valve 43.

The overhead from stripper 37 is passed through line 49 and may be purged from the system through line 50, controlled by valve 51, or valve 51 may remain closed, valve 53 opened, and the gases by means of open valve 65 and lines 52 and 64, valve 63 being closed, passed into treating unit 54 which is maintained at from 0 to 150° F. below the temperature in the isomerization unit 28, said treating unit containing spent catalyst which has been withdrawn from the unit 28 through side valve 29. In this treating unit the hydrogen sulfide is effectively maintained at a minimum in the system by its removal as a complex with the aluminum chloride. The treated gas which principally contains hydrogen chloride is passed through open valve 69 into 68 and from there into line 44 where it is admixed with the recycle bottoms from tower 39, and this mixture is then passed by means of line 44 into contact and admixture with fresh feed in line 24. The overhead in line 52 may by-pass treater 54 by closing valve 65 and opening valve 63, in which case the recycled promoter goes directly through line 56 into admixture with the fresh feed entering the system and passing to the reactor through lines 24 and 27.

In another modification (but not shown in the drawing) the hydrogen sulfide treating unit 54 and feed heater 26 may be consolidated together with reactor 28. Heater 26 is removed from lines 24 and 27 and is employed as a jacket heater on reactor 28 and situated somewhere between the inlets of lines 18 and 27. The exact location of the heater is determined by reference to the rate of feed throughput and amount of hydrogen sulfide to be removed, the higher the throughput and hydrogen sulfide concentration the larger the amount of spent aluminum chloride required.

Thus it is readily understood that in place of separately withdrawing spent catalyst through valve or feeder 29 and separately utilizing it in treater 54, the zone adjacent valve 29 in reactor 28 may itself become the treating zone 54 but in such a case heater 26 must be behind this treating zone and ahead of the isomerization zone since the temperature of treating is somewhat lower than the isomerization temperature. Due to the downward path of the catalyst mass some heat is supplied to the treating operation because the mass tends to give up its retained heat when flowing from the isomerization zone to the treating zone, but the rate of downward flow of catalyst mass and the isomerization temperatures are not sufficiently great to cause overheating during the treating operation.

The introduction of aluminum chloride-normal butane vapors into tower 28 by means of line 11 and its branch lines 14, 16 and 18 may be carried out continuously or intermittently, depending upon the particular catalytic activity to be maintained in the catalyst mass contained in tower 28. As the mass becomes gradually diminished in activity and as the process continues to run, regardless of whether the mass is becoming diminished in activity or not, certain increments such as, for example, in a large scale unit of 10,000 lbs., increments of the order of 250 to 500 lbs. of spent catalyst or used catalyst, are withdrawn through the gate 29 and may either be used to pretreat the feed stock or may be used in treating unit 54; and, co-extensive with the withdrawal of these quantities of used catalyst, fresh carrier in introduced into the top of reactor 28 through valved conduits as previously described. Because of this method of operation one of the advantages is in the fact that no shutdown is necessary in order to remove catalyst from the tower for regeneration, cleaning and the like. The spent catalyst removed through line 29 may be subjected to regeneration treatment and then returned to hopper 33 after the carbonaceous impurities, residual aluminum chloride and the like, have been removed by heating in the presence of inert gases or by treating with chlorine or other similar suitable treatments.

In operating the heretofore-described process with reference to the accompanying drawing but with respect to a feed stock comprising predominantly normal pentane instead of one comprising predominantly normal butane, slightly milder reaction conditions are maintained than those previously described with reference to the normal butane feed stocks. In the case of the normal pentane feed stock, a reaction temperature of between about 150° F. and about 225° F. and a pressure between about 50 and about 100 lbs./sq. in gauge are maintained. The space velocity or throughput of the feed stock through the catalyst mass is usually between about 0.75 and about 2.5 liquid volumes of feed per volume of catalyst per hour, while about the same amount of promoter, for example hydrogen chloride, and about the same concentration of aluminum chloride in the catalyst mass are maintained as in the case of normal butane isomerization.

Having now thus described and illustrated the character of the invention, what is desired to be secured by Letters Patent is:

1. A process of isomerizing normal paraffin of at least four carbon atoms per molecule in the vapor phase which comprises passing said normal paraffin vapor together with hydrogen halide vapor under isomerization reaction conditions through a bed of aluminum chloride sorbed in a porous carrier to effect isomerization as the principal reaction in which said catalyst bed is formed by introducing all the aluminum chloride content therein at a point in said bed intermediate the point of introduction of the normal paraffin and hydrogen halide into said bed and the point of withdrawal of the reacted mixture from the reaction zone, the introduction of the aluminum chloride being regulated as to amount and frequency of addition so that the concentration and activity of aluminum chloride in the carrier is higher at the point of said introduction of the feed stock into the catalyst bed than at the point of withdrawal of the reacted mixture the greatest concentration of aluminum chloride being intermediate these two points.

2. A process as in claim 1 wherein the aluminum chloride is introduced in sufficient amounts to maintain catalyst activity and to form fresh quantities of catalyst mass but in insufficient amounts to be present in the gaseous effluent from the reaction zone in any substantial amounts.

3. A process as in claim 1 wherein fresh carrier is added at one end of the solid catalyst mass bed and spent catalyst is withdrawn at the opposite end, wherein the feed stock first contacts the most spent catalyst prior to contacting the fresh catalyst.

4. A process of isomerizing normal paraffin of at least four carbon atoms per molecule in the vapor phase which comprises passing said normal paraffin vapors together with hydrogen chloride vapors under isomerization reaction conditions upwardly through a vertical column of aluminum chloride sorbed on a partially dehydrated bauxite to effect isomerization as the principal reaction, said column of catalyst mass being formed and maintained by introducing aluminum chloride vapors into said bauxite at a point from about one-third to about two-thirds of the column's height from the bottom thereof, in sufficient amount to produce an active catalyst mass yet in insufficient amounts to have appreciable quantities of aluminum chloride unabsorbed in the bauxite and present in the reacted effluent, removing reacted effluent from the top of the catalyst bed and separating isoparaffin therefrom.

5. A process as in claim 4 wherein normal paraffin feed is employed as a carrier gas for introducing aluminum chloride vapor into the bauxite and wherein sufficient aluminum chloride is introduced so as to maintain as the highest aluminum chloride concentration in the bed between about 5 and about 20 weight per cent of aluminum chloride based on the bauxite carrier.

6. A process as in claim 4 wherein normal paraffin feed is employed as a carrier gas for introducing aluminum chloride vapor into the bauxite, wherein sufficient aluminum chloride is introduced so as to maintain as the highest aluminum chloride concentration in the bed between about 5 and about 20 weight per cent of aluminum chloride based on the bauxite carrier, wherein fresh bauxite is added at the top of the catalyst bed in the amount and at the rate that spent solid catalyst mass is withdrawn from the bottom of the catalyst bed.

7. A process as in claim 4 wherein normal paraffin feed is employed as a carrier gas for introducing aluminum chloride vapor into the bauxite, wherein sufficient aluminum chloride is introduced so as to maintain as the highest aluminum chloride concentration in the bed between about 8 and about 12 weight per cent of aluminum chloride based on the bauxite carrier, wherein fresh bauxite is added at the top of the catalyst bed in the amount and at the rate that spent solid catalyst mass is withdrawn from the bottom of the catalyst bed, and wherein the spent catalyst so removed is employed to pretreat the normal paraffin vapors and recycled hydrogen chloride prior to contact with the catalyst mass.

8. A process as in claim 4 wherein normal paraffin feed is employed as a carrier gas for introducing aluminum chloride vapor into the bauxite, wherein sufficient aluminum chloride is introduced so as to maintain as the highest aluminum chloride concentration in the bed between about 8 and about 12 weight per cent of aluminum chloride based on the bauxite carrier, wherein fresh bauxite is added at the top of the catalyst bed in the amount and at the rate that spent solid catalyst mass is withdrawn from the bottom of the catalyst bed, employing spent isomerization catalyst as a treating agent for the normal paraffin-hydrogen chloride feed prior to the removal of the spent catalyst from the isomerization system while at a lower temperature than that maintained during the isomerization reaction.

9. A process of isomerizing normal butane in the vapor phase which comprises passing normal butane vapors together with between about 2 and about 12 weight per cent of hydrogen chloride at between about 0.5 and about 5 liquid volumes per volume of catalyst mass per hour, at between about 200° F. and about 375° F., under a pressure of between about 150 and about 300 lbs./sq. in., upwardly from the bottom through a vertical catalyst mass formed and maintained by introducing aluminum chloride-normal butane vapors at isomerization reaction temperatures into a vertical column of a partially dehydrated Porocel at a point about 40% of the height of the catalyst mass from the bottom so as to give a highest concentration of aluminum chloride on Porocel of about 12% by weight, and segregating isobutane from the reacted mixture.

10. A process of isomerizing normal pentane in the vapor phase which comprises passing normal pentane vapors together with between about 2 and about 12 weight per cent of hydrogen chloride, at between about 0.75 and about 2.5 liquid volumes per volume of catalyst mass per hour, at between about 150° F. and about 225° F., under a pressure of between about 50 and about 100 lbs./sq. in., upwardly from the bottom through a vertical catalyst mass formed and maintained by introducing aluminum chloride-normal pentane vapors at isomerization reaction temperatures into a vertical column of a partially dehydrated Porocel at a point about 40% of the height of the catalyst mass from the bottom so as to give a highest concentration of aluminum chloride on Porocel of about 12% by weight, and segregating isopentane from the reacted mixture.

11. A process as in claim 9 wherein the reaction is carried out continuously and wherein the aluminum chloride is continuously introduced into the catalyst mass, adding Porocel at least intermittently to the top of the catalyst mass and withdrawing at least intermittently with correlation of the carrier addition a like amount of spent solid catalyst mass from the bottom of the catalyst mass.

12. A process as in claim 10 wherein the reaction is carried out continuously and wherein the aluminum chloride is continuously introduced into the catalyst mass, adding Porocel at least intermittently to the top of the catalyst mass and withdrawing at least intermittently with correlation of the carrier addition a like amount of spent solid catalyst mass from the bottom of the catalyst mass.

13. A process as in claim 9 wherein the reaction is carried out continuously and wherein the aluminum chloride is continuously introduced into the catalyst mass, adding Porocel at least intermittently to the top of the catalyst mass and withdrawing at least intermittently with correlation of the carrier addition a like amount of spent solid catalyst mass from the bottom of the catalyst mass, and wherein the catalyst mass so withdrawn is employed for the pretreatment of the feed stock to remove olefins and water therefrom.

14. A process as in claim 10 wherein the reaction is carried out continuously and wherein the aluminum chloride is continuously introduced into the catalyst mass, adding Porocel at least intermittently to the top of the catalyst mass and withdrawing at least intermittently with correlation of the carrier addition a like amount of spent solid catalyst mass from the bottom of the catalyst mass, and wherein the catalyst mass so withdrawn is employed for the pretreatment of the feed stock to remove olefins and water therefrom.

15. A process according to claim 4 wherein normal paraffin feed is employed as a carrier gas for introducing aluminum chloride vapor into the bauxite, wherein sufficient aluminum chloride is introduced so as to maintain as the highest aluminum chloride concentration in the bed between about 8 and about 12 weight per cent of aluminum chloride based on the bauxite carrier, wherein fresh bauxite is added at the top of the catalyst bed in the amount and at the rate that spent solid catalyst mass is withdrawn from the bottom of the catalyst bed, and wherein the reacted mixture is subjected to a stripping operation to remove the hydrogen chloride overhead, and wherein the spent catalyst is employed at a temperature between 0° and about 150° F. lower than that maintained in the isomerization reaction to pretreat the hydrogen chloride removed overhead from the stripping operation and wherein the thus pretreated hydrogen chloride is recycled to the isomerization zone in admixture with fresh normal paraffin feed.

HENRY J. OGORZALY.